United States Patent
Kim et al.

(10) Patent No.: US 8,610,094 B2
(45) Date of Patent: Dec. 17, 2013

(54) TERAHERTZ WAVE GENERATOR AND METHOD OF GENERATING TERAHERTZ WAVE

(75) Inventors: Namje Kim, Daejeon (KR); Kyung Hyun Park, Daejeon (KR); Sang-Pil Han, Daejeon (KR); Hyunsung Ko, Seoul (KR); Jeong Woo Park, Daejeon (KR); Han-Cheol Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/615,144

(22) Filed: Sep. 13, 2012

(65) Prior Publication Data

US 2013/0161541 A1  Jun. 27, 2013

(30) Foreign Application Priority Data

Dec. 23, 2011  (KR) .................. 10-2011-0141295

(51) Int. Cl.
  *B01J 19/12*  (2006.01)
(52) U.S. Cl.
  USPC .............. 250/503.1; 250/493.1; 250/494.1; 250/505.1; 359/326; 359/328

(58) Field of Classification Search
  USPC ............ 250/493.1, 494.1, 503.1, 505.1; 359/326, 328
  See application file for complete search history.

(56) References Cited

U.S. PATENT DOCUMENTS

| | | | | |
|---|---|---|---|---|
| 6,141,138 | A * | 10/2000 | Machida et al. | 359/279 |
| 6,525,868 | B2 * | 2/2003 | Merriam et al. | 359/326 |
| 8,265,105 | B2 * | 9/2012 | Sucha et al. | 372/6 |
| 8,369,002 | B2 * | 2/2013 | Maki et al. | 359/326 |
| 8,503,068 | B2 * | 8/2013 | Sakuma | 359/328 |
| 2011/0085573 | A1 * | 4/2011 | Bartels et al. | 372/25 |
| 2011/0192978 | A1 * | 8/2011 | Jeon et al. | 250/339.06 |

* cited by examiner

*Primary Examiner* — Michael Logie

(57) ABSTRACT

Disclosed is a terahertz wave generator which includes a first light source outputting a first light having a first frequency; a second light source outputting a second light having a second frequency different from the first frequency; a second harmonic generation unit performing second harmonic conversion on the first and second lights to generate a third light and a fourth light; and a photomixer converting a mixing light of the third and fourth lights into a terahertz wave alternating signal and outputting a terahertz wave.

12 Claims, 4 Drawing Sheets

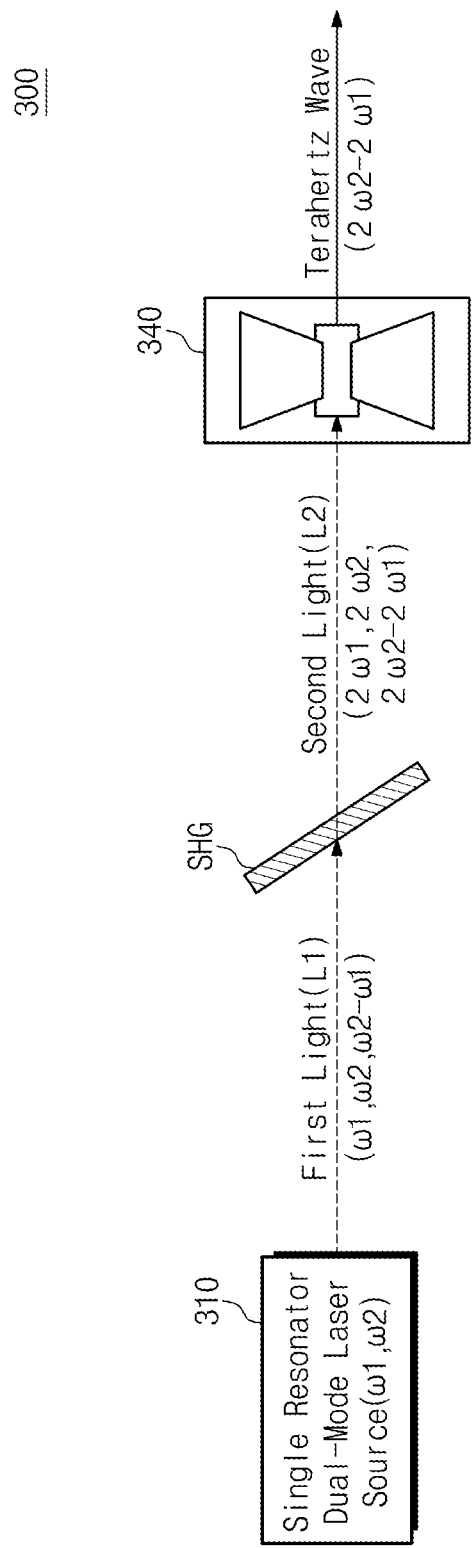

TERAHERTZ WAVE GENERATOR AND METHOD OF GENERATING TERAHERTZ WAVE

CROSS-REFERENCE TO RELATED APPLICATIONS

A claim for priority under 35 U.S.C. §119 is made to Korean Patent Application No. 10-2011-0141295 filed Dec. 23, 2011, in the Korean Intellectual Property Office, the entire contents of which are hereby incorporated by reference.

BACKGROUND

The inventive concepts described herein relate to a wireless device, and more particularly, relate to a terahertz wave generator and a terahertz wave generating method.

A terahertz wave may have a frequency of 0.1 THz to 10 THz, and may be characterized in that it is harmless to humans due to its low energy and has an inherent spectrum (e.g., terahertz wave fingerprint). For this reason, the terahertz wave may have been researched. Up to now, the research may have been made using a time-domain spectroscopy (TDS) system using a femtosecond (fs) laser. The TDS system may excite carriers at a photoconductive switch of a photomixer using the femtosecond laser. The photoconductive switch may be formed of a material having a very short carrier lifetime, which enables a femtosecond level of a pulsed current to flow through an antenna.

When a pulsed current flows through an integrated antenna, a wideband terahertz wave may be generated to be propagated to the air. That is, the TDS system may use a pulsed terahertz wave. However, a device generating a femtosecond laser may be bulky and high-priced. Also, a handheld system using a terahertz continuous wave instead of time-domain spectroscopy may be useful at applications used at the field. A photomixing technique using a photoconductive antenna or photomixer and a laser having different wavelengths may have been researched to apply it to the field or to implement a subminiature system.

SUMMARY

Example embodiments of the inventive concept provide a terahertz wave generator comprising a first light source outputting a first light having a first frequency; a second light source outputting a second light having a second frequency different from the first frequency; a second harmonic generation unit performing second harmonic conversion on the first and second lights to generate a third light and a fourth light; and a photomixer converting a mixing light of the third and fourth lights into a terahertz wave alternating signal and outputting a terahertz wave.

In example embodiments, the second harmonic generation unit adjusts incidence angles of the third and fourth lights such that the third and fourth lights are mixed and a result is incident onto the photomixer.

In example embodiments, the third light has a frequency two times higher than a frequency of the first light and the fourth light has a frequency two times higher than a frequency of the second light.

In example embodiments, the photomixer generates an alternating signal having a frequency corresponding to a difference between frequencies of the third and fourth lights.

In example embodiments, each of the first and second light sources is an InP-based light source generating light having a band of 1300 nm to 1550 nm.

In example embodiments, each of the first and second light sources has a wavelength lower than a bandgap energy of an InP or GaAs-based photomixer.

In example embodiments, the photomixer is an GaAs-based photomixer having an operating band of 800 nm to 900 nm.

In example embodiments, one of the first and second light sources is a variable frequency light source.

In example embodiments, the alternating signal output from the photomixer is varied twice more than a frequency variation of the first or second light source.

Example embodiments of the inventive concept also provide a terahertz wave generator comprising a dual-mode single resonator generating two lights having different frequencies and outputting a first light having a frequency corresponding to a difference between frequencies of the two lights; a second harmonic generator performing second harmonic conversion on the first light to output a second light; and a photomixer converting the second light into a terahertz wave alternating signal and outputting a terahertz wave.

In example embodiments, a frequency of the second light is double of a frequency of the first light.

Example embodiments of the inventive concept also provide a terahertz wave generating method comprising generating a first light and a second light having different frequencies; generating a third light by performing second harmonic generation on the first and second lights and mixing the first and second lights; converting the third light into a terahertz wave alternating signal using a photomixer; and outputting the terahertz wave alternating signal as a terahertz wave.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 4 is a diagram schematically illustrating a terahertz wave generator according to another embodiment of the inventive concept.

DETAILED DESCRIPTION

Figure 1:
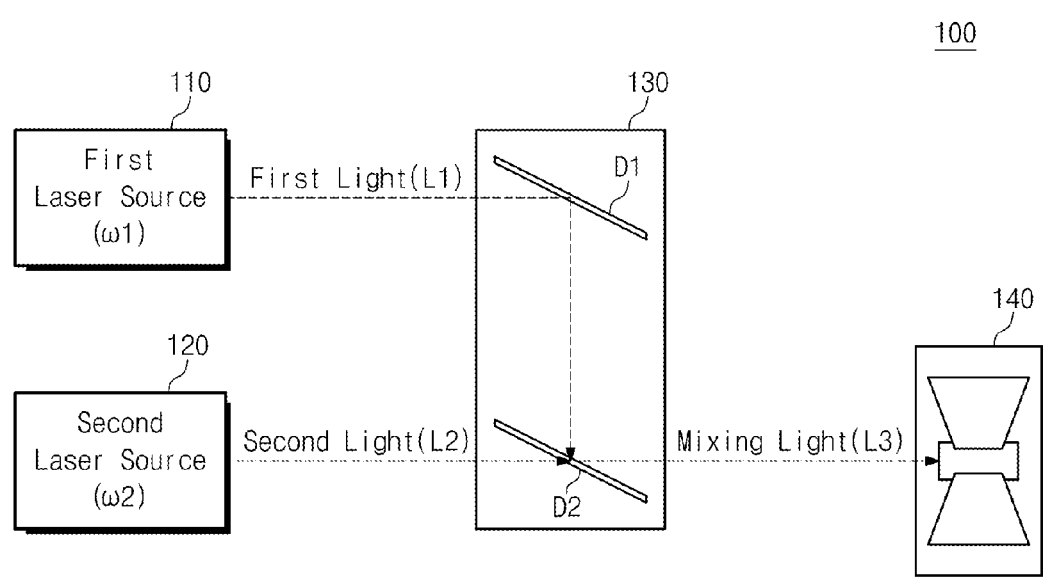
FIG. 1 is a diagram schematically illustrating a conventional terahertz wave generator.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram schematically illustrating a conventional terahertz wave generator. Referring to FIG. 1, a terahertz wave generator 100 may include a first laser source 110, a second laser source 120, an optical alignment unit 130, and a photomixer 140.

The first laser source 110 may output first light L1 having a first frequency $\omega 1$. The second laser source 120 may output second light L2 having a second frequency $\omega 2$ different from the first frequency $\omega 1$. The first and second lights L1 and L2 may be sent to the optical alignment unit 130.

The optical alignment unit 130 may include a mirror for overlapping of the first and second lights L1 and L2 or an optical waveguide such as an optical fiber. The optical alignment unit 130 may mix the first and second lights L1 and L2 to generate mixing light L3. The mixing light L3 may be a beating signal formed by the first and second lights L1 and L2. The mixing light L3 may have a beating frequency corresponding to a difference between the first frequency $\omega 1$ of the first light L1 and the second frequency $\omega 2$ of the second light L2. For example, a beating frequency of the mixing light L3 may belong to a terahertz wave band.

The photomixer 140 may output a terahertz wave in response to an incident mixing light L3. A frequency of the terahertz wave may be identical to a beating frequency of the mixing light L3.

Mixing may be made using a beating signal generated by two different lasers L1 and L2. A beating signal having a terahertz frequency may be generated by the lasers L1 and L2 having different wavelengths, and the photomixer 140 may generate an AC current of the terahertz frequency using the beating signal. At this time, an antenna integrated at the photomixer 140 may generate a terahertz wave. A frequency of the terahertz wave may be equal to a frequency of the beating signal, that is, a wavelength difference of the lasers L1 and L2. Thus, it is possible to provide a frequency tunable terahertz wave generator by adjusting one of wavelengths of the lasers L1 and L2 using the same.

A conventional terahertz continuous wave generating and detecting device may use two independent distributed feedback (DFB) laser sources. Beating may be generated when beams output from the DFB laser sources operating at different wavelengths are overlapped at an optical fiber or a space.

An InP based laser source may have an excellent operating property at a wavelength of 1300 nm to 1550 nm. A GaAs based photomixer may have an excellent operating property at a wavelength of 800 nm.

There may have been researched a photomixer of 1550 nm such as a photomixer based on InGaAs doped by InGaAs or Fe at a low growth temperature. However, in dark current and thermal properties due to low bandgap energy, such a photomixer may experience physical limit as compared with a photomixer based on GaAs. To overcome such limit, a photomixer based on a high-speed photo-detector may have been researched. However, it is difficult to apply a photomixer based on an optical component to a wide band due to its property.

In case of a laser source used at photomixing, a characteristic of an InP based element operating at a wavelength of 1300 nm to 1550 nm may be excellent. In case of a photomixer, characteristics of GaAs based elements operating at a wavelength of 1.55 μm to 1.3 μm may be excellent. Therefore, it is possible to an effective terahertz continuous wave generator by using a laser having a band of 1.55 μm to 1.3 μm and a photomixer having a band of 800 nm.

A bandgap of a GaAs-based photomixer may be 870 nm at a room temperature. Since a GaAs-based photomixer does not absorb a photon having a longer wavelength than 870 nm, it may not be used together with an InP-based source.

To solve the above-described problems, a terahertz wave generator according to an embodiment of the inventive concept may solve mismatch of an operating wavelength between a source and a photomixer using second harmonic generation (SHG). As a result, it is possible to provide a terahertz wave generator having improved reliability and operating property.

Figure 2:
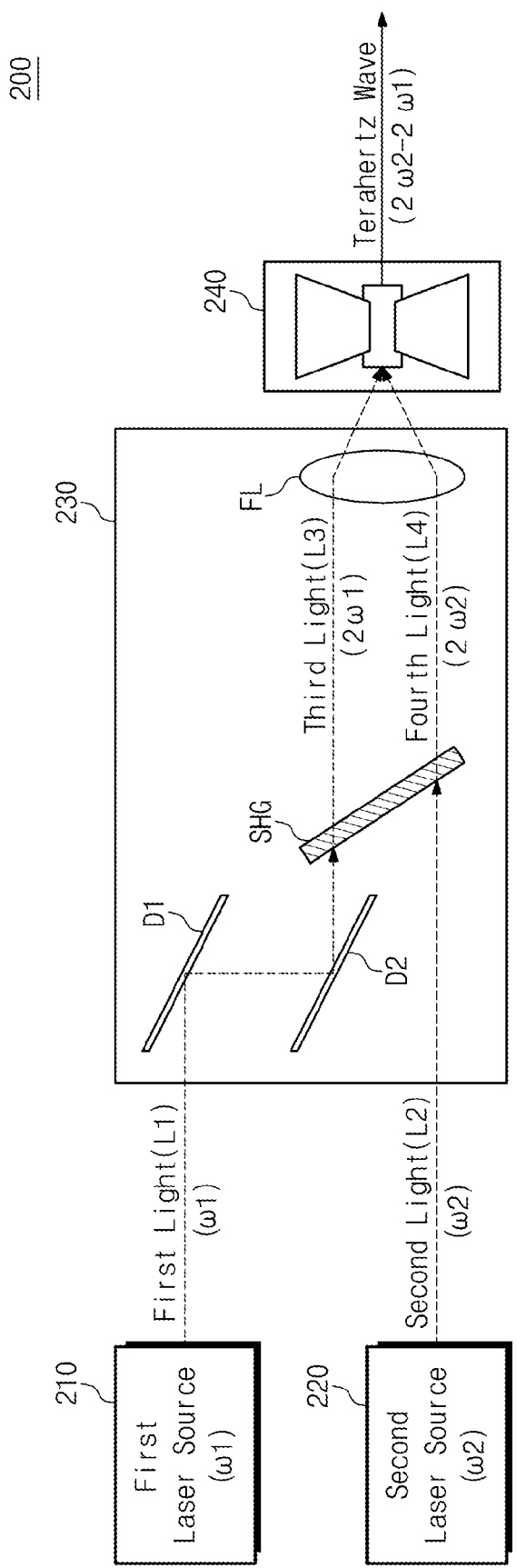
FIG. 2 is a diagram schematically illustrating a terahertz wave generator according to an embodiment of the inventive concept.

FIG. 2 is a diagram schematically illustrating a terahertz wave generator according to an embodiment of the inventive concept. Referring to FIG. 2, a terahertz wave generator 200 may include a first laser source 210, a second laser source 220, a second harmonic generation unit 230, and a photomixer 240.

The first laser source 210 may be an InP-based laser source. The first laser source 210 may output first light L1 having a first frequency $\omega 1$. The first light L1 may have a wavelength of 1300 nm to 1550 nm.

The second laser source 220 may be an InP-based laser source. The second laser source 220 may output second light L2 having a second frequency $\omega 2$ different from the first frequency $\omega 1$. The second light L2 may have a wavelength of 1300 nm to 1550 nm. The first laser source 210 or the second laser source 220 may be a variable laser source capable of varying a frequency.

The second harmonic generation unit 230 may receive the first and second lights L1 and L2. The second harmonic generator 230 may perform second harmonic generation on the first and second lights L1 and L2 to output third and fourth lights L3 and L4 having frequencies two times higher than frequencies $\omega 1$ and $\omega 2$ of the first and second lights L1 and L2. The second harmonic generator 230 may adjust incidence angles of the third and fourth lights L3 and L4 such that the third and fourth lights L3 and L4 are incident onto the photomixer 240.

The second harmonic generation unit 230 may include waveguides D1 and D2 such as a mirror or an optical fiber, a second harmonic generator SHG, and a focusing lens FL.

The waveguides D1 and D2 may control a path of the first light L1 such that the first and second lights L1 and L2 reach the focusing lens FL through the second harmonic generator SHG.

The second harmonic generator SHG may be formed of a nonlinear birefringence crystal. The second harmonic generator SHG may output light having a frequency two times higher than a frequency of incident light. A property of the second harmonic generator SHG may be expressed by the following equation 1.

$$P_k = \epsilon_0(\chi_{ik}+^{(1)}E_i + \chi_{ijk}+^{(2)}E_iE_j + \chi_{ijlk}+^{(3)}E_iE_jE_k+ \quad \text{[Equation 1]}$$

In the equation 1, $\epsilon$ may indicate susceptibility of the second harmonic generator SHG, and E may indicate an electric field of incident light.

The electric field of incident light may be expressed by the following equation 2.

$$E_i = \epsilon_i \exp(-i\omega t) + c.c. \quad \text{[Equation 2]}$$

The equation 1 may be expressed by the following equation 3 by substituting the equation 2 into the equation 1.

$$P_k(NL) = \chi_{ijk}^{(2)}(\epsilon_i\epsilon_j\exp(-i2\omega t) + \epsilon^*_i\epsilon^*_j\exp(i2\omega t) + \epsilon_i\epsilon^*_j + \epsilon^*_i\epsilon_j) \quad \text{[Equation 3]}$$

That is, when a frequency of incident light of the second harmonic generator SHG, output light may have a frequency of $2\omega$.

Lights L3 and L4 having frequencies doubled through the second harmonic generator SHG may be focused by the focusing lens FL. The focusing lens FL may adjust incidence angles such that the third and fourth lights L3 and L4 are incident onto the photomixer 240.

The photomixer 240 may be formed of a substance having a bandgap of a 800 nm band as a GaAs-based substance.

If the second harmonic generator SHG is placed between the laser sources 210 and 220 and the photomixer 240, mismatch of optimized frequencies between the laser sources 210 and 220 and the photomixer 240 may be solved.

For example, the first laser source 210 may output first light L1 of 1300 nm to 1550 nm. The first light L2 may be converted into third light L3 through the second harmonic generator SHG. A frequency of the third light L3 may be double a frequency of the first light L1. That is, the third light L3 may have a wavelength of 650 nm to 775 nm. A wavelength of the third light L3 may be shorter than a bandgap of the photomixer 240. Thus, the photomixer 240 may normally react to the third light L3. Likewise, the photomixer 240 may normally react to the fourth light L4.

If the third and fourth lights L3 and L4 are mixed, there may be generated an alternating current having a frequency corresponding to a difference between frequencies of the third and fourth lights L3 and L4. And, there may be generate a terahertz wave having a frequency corresponding to a difference between frequencies of the third and fourth lights L3 and L4. Alternatively, alternating currents having frequencies corresponding to frequencies of the third and fourth lights L3 and L4 may be generated, so that there is generated a terahertz wave having a frequency corresponding to a difference between frequencies of the third and fourth lights L3 and L4.

As described above, if SHG laser light is generated using a laser operating at a long wavelength, a terahertz continuous wave may be generated using a photomixer operating at a short wavelength. Also, a variation in a frequency due to a wavelength variation may be less at a long wavelength. Since a variation in a wavelength for obtaining the same frequency variation may be large, the accuracy of frequency may be improved compared with the case that a short wavelength laser is used.

A wavelength must be continuously varied at a wide range to widen a frequency tuning range of a terahertz continuous wave generated when a long wavelength laser is used. If second harmonic generation is used, a frequency tuning range may be doubled. That is, a frequency of a beating signal formed by first and second lights L1 and L2 having first and second frequencies $\omega 1$ and $\omega 2$ may be equal to a difference of the first and second frequencies $\omega 1$ and $\omega 2$. However, the third and fourth lights L3 and L4 experiencing second harmonic generation (SHG) may have frequencies of $2\omega 1$ and $2\omega 2$, respectively. A frequency of a beating signal formed by the third and fourth lights L3 and L4 experiencing second harmonic generation (SHG) may correspond to a difference ($2(\omega 1 - \omega 2)$) of the first and second frequencies $\omega 1$ and 107 2. That is, if the second harmonic generation is used, a frequency tuning range may be doubled. Compared with a conventional terahertz wave generator 100, the terahertz wave generator 200 according to an embodiment of the inventive concept may be more efficient and more reliable in light of the accuracy of frequency tuning and a tuning range.

Figure 3:
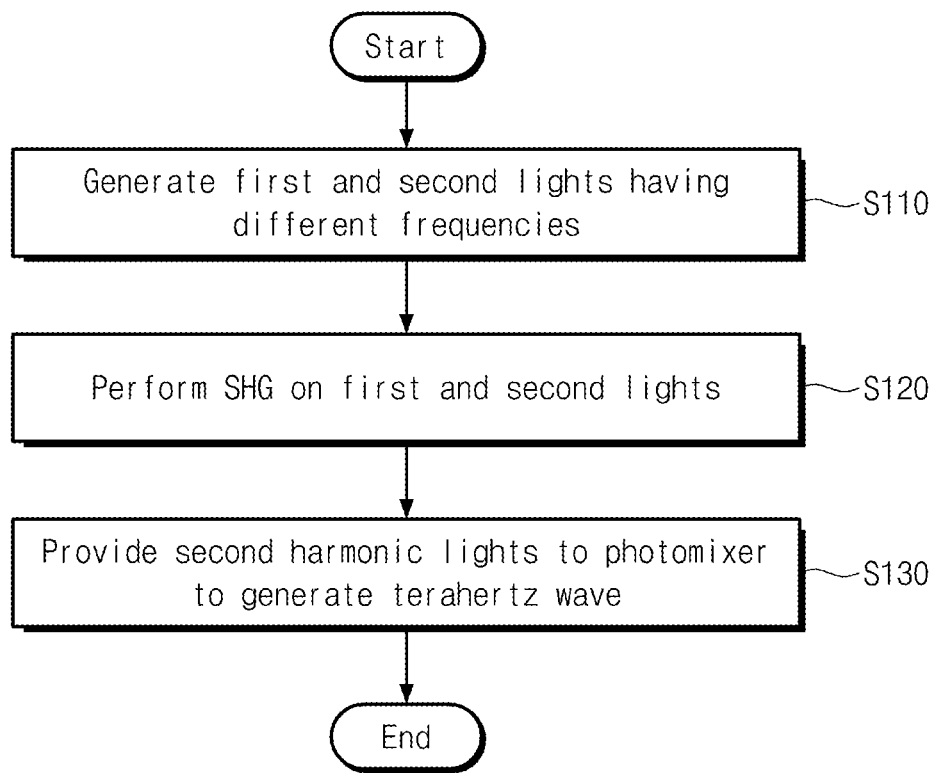
FIG. 3 is a flowchart illustrating a terahertz wave generating method according to an embodiment of the inventive concept.

FIG. 3 is a flowchart illustrating a terahertz wave generating method according to an embodiment of the inventive concept. Referring to FIG. 3, in operation S110, first and second lights having different frequencies may be generated. In operation S120, second harmonic generation may be performed with respect to the first and second lights. If second harmonic generation is performed, there may be generated second harmonic lights having frequencies two times higher than frequencies of the first and second lights. In operation S130, second harmonic lights experiencing second harmonic generation (SHG) may be provided to a photomixer such that a terahertz wave is generated.

A beating signal may be generated when the first and second lights or the second harmonic lights are mixed. A photomixer may generate a terahertz wave according to the beating signal.

FIG. 4 is a diagram schematically illustrating a terahertz wave generator according to another embodiment of the inventive concept. Referring to FIG. 4, a terahertz wave generator 300 may include a dual-mode single resonator laser source 310, a second harmonic generator SHG, and a photomixer 340.

The dual-mode single resonator laser source 310 may output lasers having two frequencies ω1 and ω2.

The accuracy of a frequency of a terahertz continuous wave may be proportional to that of a laser used to generate the terahertz continuous wave. In the event that two independent lasers are used to generate the terahertz continuous wave, wavelength vibration generated due to external noise must be minimized. In the event that there is used the dual-mode single resonator laser source 310 in which two laser lights are generated through one resonator structure, level and direction of wavelength vibration generated due to external noise may be identical, so that a wavelength/frequency difference of two laser lights may be stabilized. That is, the reliability of the terahertz wave generator 300 may be improved.

With the inventive concept, a source and a photomixer may operate at a wavelength having the optimized reliability, respectively. Also, since adjustment of a frequency is made at a long wavelength, the reliability of frequency adjustment may be improved. Since a frequency of the source is converted into a second harmonic wave, a frequency adjustment range of a terahertz wave may be improved.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A terahertz wave generator comprising:
    a first light source outputting a first light having a first frequency;
    a second light source outputting a second light having a second frequency different from the first frequency;
    a second harmonic generation unit performing second harmonic conversion on the first and second lights to generate a third light and a fourth light; and
    a photomixer converting a mixing light of the third and fourth lights into a terahertz wave alternating signal and outputting a terahertz wave.

2. The terahertz wave generator of claim 1, wherein the second harmonic generation unit adjusts incidence angles of the third and fourth lights such that the third and fourth lights are mixed and a result is incident onto the photomixer.

3. The terahertz wave generator of claim 1, wherein the third light has a frequency two times higher than a frequency of the first light and the fourth light has a frequency two times higher than a frequency of the second light.

4. The terahertz wave generator of claim 1, wherein the photomixer generates an alternating signal having a frequency corresponding to a difference between frequencies of the third and fourth lights.

5. The terahertz wave generator of claim 1, wherein each of the first and second light sources is an InP-based light source generating light having a band of 1300 nm to 1550 nm.

6. The terahertz wave generator of claim 1, wherein each of the first and second light sources has a wavelength lower than a bandgap energy of an InP or GaAs-based photomixer.

7. The terahertz wave generator of claim 1, wherein the photomixer is an GaAs-based photomixer having an operating band of 800 nm to 900 nm.

8. The terahertz wave generator of claim 1, wherein one of the first and second light sources is a variable frequency light source.

9. The terahertz wave generator of claim 8, wherein the alternating signal output from the photomixer is varied twice more than a frequency variation of the first or second light source.

10. A terahertz wave generator comprising:
    a dual-mode single resonator generating two lights having different frequencies and outputting a first light having a frequency corresponding to a difference between frequencies of the two lights;
    a second harmonic generator performing second harmonic conversion on the first light to output a second light; and
    a photomixer converting the second light into a terahertz wave alternating signal and outputting a terahertz wave.

11. The terahertz wave generator of claim 10, wherein a frequency of the second light is double of a frequency of the first light.

12. A terahertz wave generating method comprising:
    generating a first light and a second light having different frequencies;
    generating a third light by performing second harmonic generation on the first and second lights and mixing the first and second lights;
    converting the third light into a terahertz wave alternating signal using a photomixer; and
    outputting the terahertz wave alternating signal as a terahertz wave.

* * * * *